(12) United States Patent  (10) Patent No.: US 8,678,414 B1
Bochereau  (45) Date of Patent: Mar. 25, 2014

(54) SET OF TRIPLE CLAMPS IN A FRONT SUSPENSION SYSTEM OF A MOTORCYCLE

(71) Applicant: Sarl Delta Usinage, Murs Erigne (FR)

(72) Inventor: Philippe Bochereau, Murs Erigne (FR)

(73) Assignee: Sarl Delta Usinage, Murs Erigne (FR)

( * ) Notice: Subject to any disclaimer, the term of this patent is extended or adjusted under 35 U.S.C. 154(b) by 0 days.

(21) Appl. No.: 13/660,210

(22) Filed: Oct. 25, 2012

(30) Foreign Application Priority Data

Sep. 6, 2012 (FR) .................................. 12 58339
Oct. 22, 2012 (FR) .................................. 12 60038

(51) Int. Cl.
*B62K 21/08* (2006.01)
(52) U.S. Cl.
USPC ....................................................... 280/276
(58) Field of Classification Search
USPC ................ 280/275, 276, 279, 283; 74/551.1, 74/551.2
See application file for complete search history.

(56) References Cited

U.S. PATENT DOCUMENTS

| 6,322,625 | B2 | 11/2001 | Im et al. |
| 6,325,402 | B1 | 12/2001 | Gogo et al. |
| 6,953,201 | B1 * | 10/2005 | VanDeMortel ............... 280/276 |
| 7,018,126 | B2 * | 3/2006 | Henricksen .................. 403/286 |
| 7,118,302 | B1 * | 10/2006 | Durham ........................ 403/344 |
| 7,146,877 | B2 * | 12/2006 | You .............................. 74/551.2 |
| 7,685,904 | B2 * | 3/2010 | Cutsforth ..................... 74/551.3 |
| 2005/0066766 | A1 * | 3/2005 | Truchinski ................... 74/551.1 |
| 2006/0163831 | A1 * | 7/2006 | Henrickson ................. 280/93.51 |
| 2008/0203699 | A1 * | 8/2008 | Truchinski ................... 280/276 |
| 2011/0239814 | A1 * | 10/2011 | Athanasiou ................. 74/551.2 |

FOREIGN PATENT DOCUMENTS

DE  20112092 U1  10/2001

* cited by examiner

*Primary Examiner* — Tashiana Adams
(74) *Attorney, Agent, or Firm* — Bachman & LaPointe, P.C.

(57) ABSTRACT

A set of triple clamps in a front suspension system of a motorcycle, has a top triple clamp and a bottom triple clamp designed to provide a pivoting connection of the front suspension system of the motorcycle with the frame of the motorcycle. The set also has a fixing system for receiving the handlebars of the motorcycle and fixing them to the top triple clamp. According to one feature, the fixing system has a handlebar damper system the movement axis of which is substantially parallel to the movement axis of the front suspension system of the motorcycle.

13 Claims, 5 Drawing Sheets

SET OF TRIPLE CLAMPS IN A FRONT SUSPENSION SYSTEM OF A MOTORCYCLE

BACKGROUND

The present invention concerns a set of triple clamps (also sometimes said T-pieces due to their particular form) in a front suspension system of a motorcycle, said assembly comprising a top triple clamp and bottom triple clamp designed to provide a pivoting connection of the front suspension system of the motorcycle with the frame of said motorcycle, said assembly also comprising a fixing system for receiving the handlebars of said motorcycle and fixing them to the top triple clamp.

FIG. 1 shows a motorcycle that conventionally consists essentially of a frame 1 on which there are mounted an engine 2, a rear wheel 3 by means of a rear suspension system 4 and a front wheel 5 by means of a front suspension system 6, itself consisting here, solely by way of example, of an inverted telescopic fork.

FIG. 2 shows a fork of a motorcycle that is of the inverted telescopic type. As will be understood hereinafter, the present invention could apply to any type of motorcycle fork.

The fork shown in FIG. 2 comprises two sheaths 10 and 11 in which two plunger tubes 12 and 13 can respectively slide. At the end of these plunger tubes 12 and 13, means are provided for mounting the front wheel of the motorcycle. Only the axis xx' of this wheel is shown in FIG. 2.

A motorcycle front fork as has just been described consists of a damper system that comprises firstly an elastic element, such as a spring or a pressurised gas the behaviour of which is such that pressing the plunger tubes 12 and 13 into the sheaths 10 and 11 is approximately proportional to the amplitude of the force that is exerted on the fork, and, secondly a hydraulic element the behaviour of which is such that the pressing of the plunger tubes 12 and 13 into the sheaths 10 and 11 takes place progressively.

Thus the greater the amplitude of an impact, the more the plunger tubes 12 and 13 will be pressed into the sheaths 10 and 11. Nevertheless, the more rapid the impact, the slower will be this pressing in.

It should be noted that in general the range of travel of such a fork is around 100 mm to 300 mm.

In the remainder of the description, the term damper system will be given solely to any system that has this double behaviour: an elastic behaviour and a dynamic behaviour.

The front suspension system 6 (more precisely here in the particular embodiment considered, the sheaths 10 and 11) is fixed to a set of triple clamps, the subject of the present invention, consisting of two triple clamps, one bottom 20 and the other top 21, which provide the connection of the two sheaths 10 and 11 so that they are parallel to each other. Each triple clamp 20 and 21 is mounted on a shaft so that the whole of the fork can pivot on a substantially vertical forwardly inclined axis yy' (only this axis yy' is shown in FIG. 2) with respect to the steering column 30 of the motorcycle frame 1. Thus a set of triple clamps provides a pivoting connection of the front suspension system 6 of the motorcycle with the frame of said motorcycle.

On the top triple clamp 21 the handlebars 40 of the motorcycle are mounted, generally by means of bridge plates or pairs of bottom 41a and top 41b bridges. Conventionally, a bridge plate or a pair of bridges 41a is fixed to the top triple clamp 21 and the handlebars 40 are clamped against it by means of another bridge plate or pair of bridges 41b that fits on top of it and is fixed to the plate or bottom pair 41a. In general terms, the bridge plates or bridges constitute a fixing system for receiving the handlebars 40 of said motorcycle and fixing them to the top triple clamp 21.

It will be noted that, in FIG. 2, some of the elements shown are also present in FIG. 1 under the same references.

Handlebar fixing systems are known that also comprise elastic means placed between the bridge plate to which the handlebars of said motorcycle are fixed and the top triple clamp of the set of triple clamps. Reference can be made to the document U.S. Pat. No. 6,322,625. Such means improve the comfort of the rider of the motorcycle compared with a situation where such means are absent. Nevertheless, this improvement in comfort takes place to the detriment of the precision of riding, in particular the steering of the motorcycle, especially on uneven ground and at relatively high speed. This is because the elastic effect acts in all directions, both vertically and laterally. There also results from the presence of these means an effect of rocking of the fork about its pivot axis, known in the language of motorcycle experts as "handlebar shake", which may prove dangerous on uneven ground.

SUMMARY OF THE INVENTION

One of the aims of the present invention is to propose a set of triple clamps as just described that procures comfort superior to the known systems while not sacrificing precision of steering.

To this end, the present invention concerns a set of triple clamps in a front suspension system of a motorcycle, said set comprising a top triple clamp and a bottom triple clamp designed to provide a pivoting connection of the front suspension system of the motorcycle with the frame of said cycle, said assembly also comprising a fixing system for receiving the handlebars of said motorcycle and fixing them to the top triple clamp. This set of triple clamps is characterised, according to the invention, in that said fixing system comprises a handlebar damper system the movement axis of which is substantially parallel to the movement axis of the front suspension system of said motorcycle.

The comfort of the rider of the motorcycle is increased compared with the systems of the prior art because the handlebar damper system is a system with behaviour that is not only elastic but also dynamic, the movement of which takes place progressively while being proportional to the intensity of the impacts in the suspension system. In addition, the impacts in the suspension system are felt less in the arms of the rider, who then holds the handlebars with more flexibility. The result is surprisingly the elimination of the handlebar shake effect.

Advantageously, said handlebar damper system does not constitute the front suspension system of the motorcycle but is a system complementary to it. To do this, it has at least one characteristic, such as maximum travel, response time or pre-stressing, that is different from the corresponding characteristics of said front suspension system. For example and advantageously, said handlebar damper system has a maximum travel of between 5 mm and 30 mm, compared with the 100 to 300 mm of maximum travel of a fork.

Advantageously, the pre-stressing of said handlebar damper system is predeterminable. This feature enables the rider of the motorcycle to adapt the behaviour of the handlebar damper system to his own corpulence.

Advantageously, the movement axis of said handlebar damper system has an angle of less than 10° with respect to the movement axis of the front suspension system of said motorcycle. It has been found in fact that, according to the types of motorcycle considered (road motorbike, motocross motorbike, endurance motorbike, etc.), for which the riding positions are completely different, the optimum inclination does not necessary coincide with that of the front suspension of the motorcycle.

Advantageously, said handlebar damper system consists of at least one handlebar damper secured firstly to said top triple clamp and secondly to a bottom bridge plate or bottom bridges designed to receive the handlebars of said motorcycle, said fixing system comprising a top bridge plate or top bridges for respectively cooperating with said bottom plate or with said bottom bridges in order to grip and fix the handlebars of said motorcycle.

Alternatively, said handlebar damper system consists of two handlebar dampers each secured first to said top triple clamp and secondly to a bottom bridge plate designed to receive the handlebars of said motorcycle, said fixing system comprising a top bridge plate or top bridges for respectively cooperating with said bottom plate in order to grip and fix the handlebars of said motorcycle.

In a particularly advantageous embodiment, each handlebar damper comprises a barrel provided with a blind bore in which a plunger can slide, said plunger being provided with a cavity in which a free piston can slide, subjected on one face to an elastic return force and on the other face to a force due to the action of a non-compressible fluid in communication, by means of at least one calibrated hole, with the space in the bore in said barrel closed by said plunger.

Said elastic return force is exerted either by a spring or by a pressurised compressible fluid. In the latter case, the pressure of the compressible fluid is pre-established by means of a valve. Thus it is possible to pre-establish the pressure on the free piston, which makes it possible to predetermine the pre-stressing of the handlebar damper system.

According to an advantageous embodiment, said set of triple clamps comprises valves so that at least one calibrated hole acts in a direction of flow of said non-compressible fluid and that at least one other calibrated with a different diameter acts in the other direction of flow.

Advantageously, it comprises means so that, for a predetermined travel, the or one passage is restricted.

BRIEF DESCRIPTION OF THE DRAWINGS

The features of the invention mentioned above, as well as others, will emerge more clearly from a reading of the following description of an example embodiment, said description being given in relation to the accompanying drawings among which.

DETAILED DESCRIPTION OF THE PREFERRED EMBODIMENT(S)

Although the invention concerns a set of triple clamps as described in the preamble of the present description, an embodiment will be described, in relation to FIG. 3, of a top triple clamp 21, it being understood that a set of triple clamps contains, as already stated in the preamble of the description, a top triple clamp and a bottom triple clamp cooperating together in order to provide a pivoting connection of the front suspension system of the motorcycle with the frame of said motorcycle.

In addition, the description is made with reference to a front suspension system of the motorcycle in the form of a fork, but the invention is in no way limited to this type of front suspension system.

Figure 3:
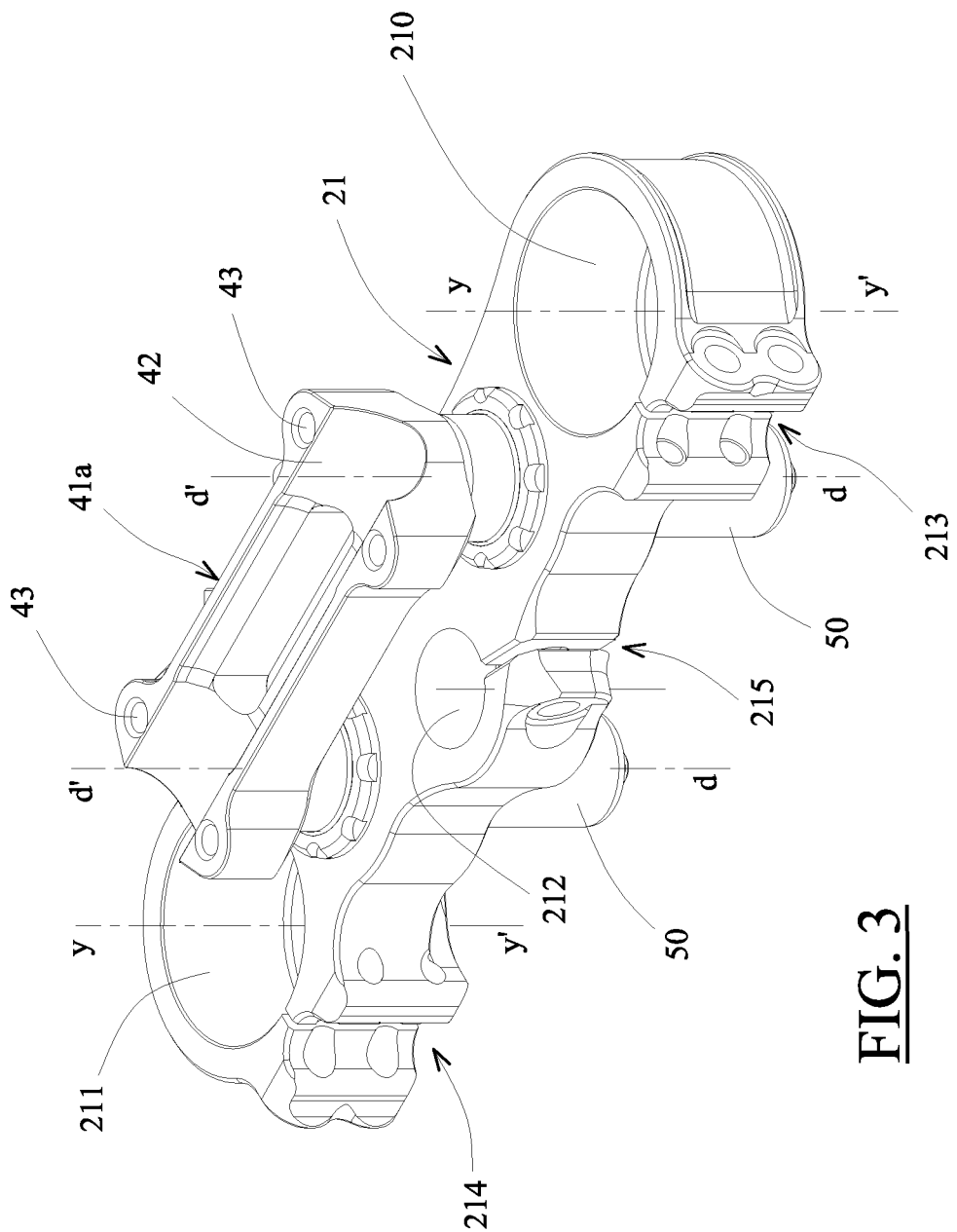
FIG. 3 is a perspective view of a triple clamp equipped with a handlebar damper system according to the present invention.

Thus the top triple clamp 21, shown in FIG. 3, has two holes 210 and 211 intended respectively to receive the right 10 and left 11 sheaths of the fork as well as a hole 212 intended to receive the top end of the shaft of the steering column 30. Means 213, 214 of clamping the sheaths and 215 of clamping this shaft are also present on the triple clamp 21.

Figure 1:
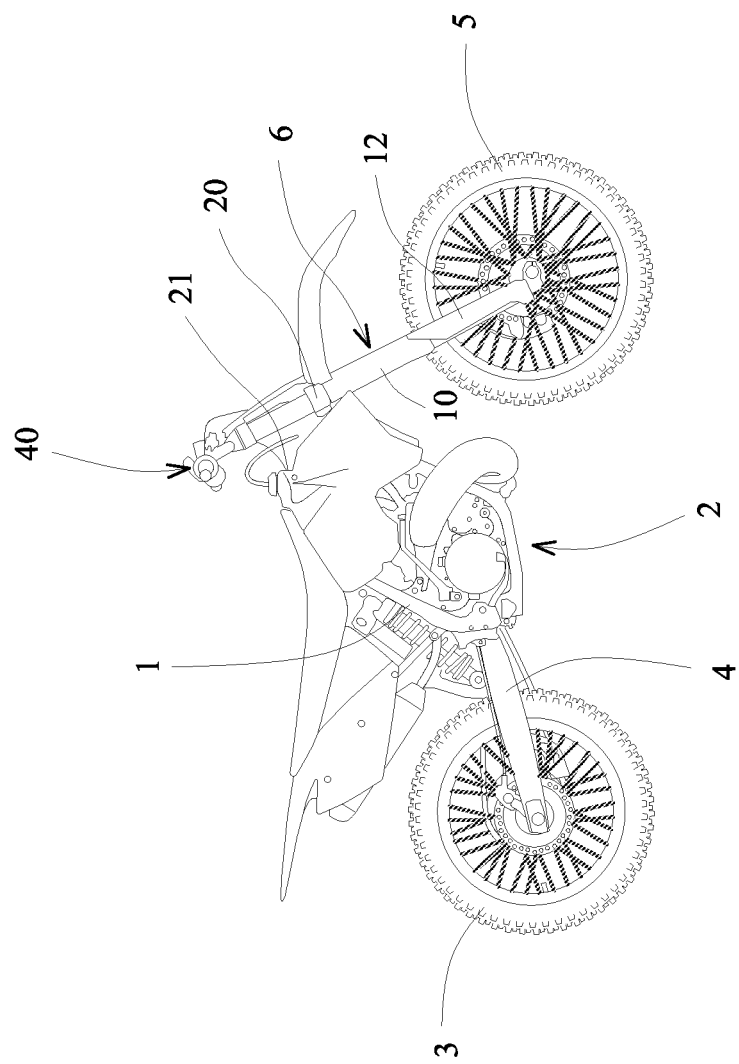
FIG. 1 is a schematic view of a motorcycle.
Figure 2:
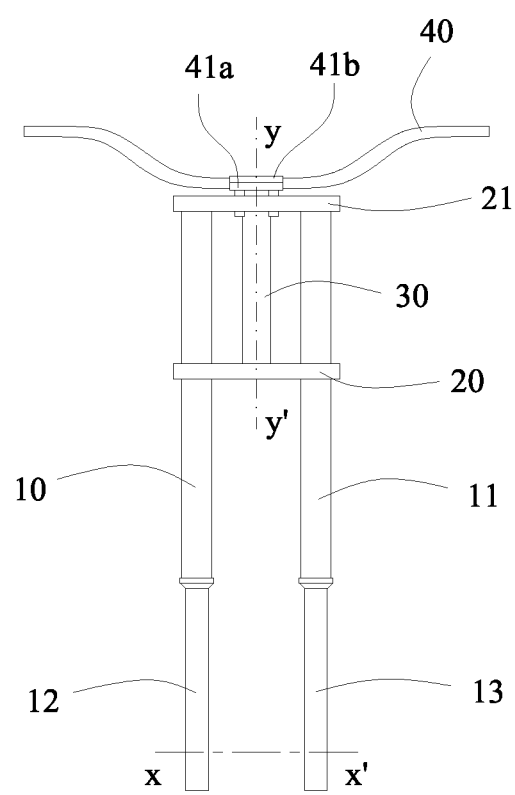
FIG. 2 is a schematic diagram of a front fork of a motorcycle like the one shown in FIG. 1.

A bottom bridge plate 41a is mounted on the triple clamp 21 by means of two dampers 50 that are described below in relation to FIGS. 4a to 4c. The bridge plate 41a is provided with a semicylindrical groove 42 designed to house the handlebars 40 of the motorcycle and is provided with threads 43 intended to receive screws for clamping a top bridge plate 41b (see FIG. 2) against the handlebars 40 in order to connect them to the triple clamp 21.

The axis of the handlebar dampers 50 is such that the bottom bridge plate 41a and therefore, after mounting thereof, the handlebars 40 as well as the top bridge plate 41b, can have only movements in translation with respect to the triple clamp 21, to the exclusion of any other movement. This translation takes place, in accordance with the invention, on an axis substantially parallel to the movement axis of the front suspension system of the motorcycle which, in the example embodiment shown, corresponds to the longitudinal axis of the fork. In FIG. 3, the axes yy' represent the movement axis of the front suspension system whereas the axes denoted dd' are the movement axes of the bridge plate 41a and consequently of the handlebars 40.

The axes dd' and the axis yy' may be parallel to each other or have a relatively small angle in order to adapt the handlebar damper system to the riding position of the rider of the motorcycle according to the type of the latter: road motorbike, endurance motorbike, motocross motorbike, etc.)

Like the suspension system consisting of the fork 60, the dampers 50 constitute a so-called handlebar damper system comprising firstly an elastic element the behaviour of which is such that the resistance force is substantially proportional to the amplitude of this pushing in and secondly a hydraulic element the behaviour of which is such that this resistance to pushing in is substantially proportional to the speed of this pushing in.

The handlebar damper system has at least one characteristic, such as the maximum travel, the response time or the pre-stressing, which is different from the corresponding characteristics of the suspension system consisting of the fork 6.

Figures 4A, 4B, 4C:
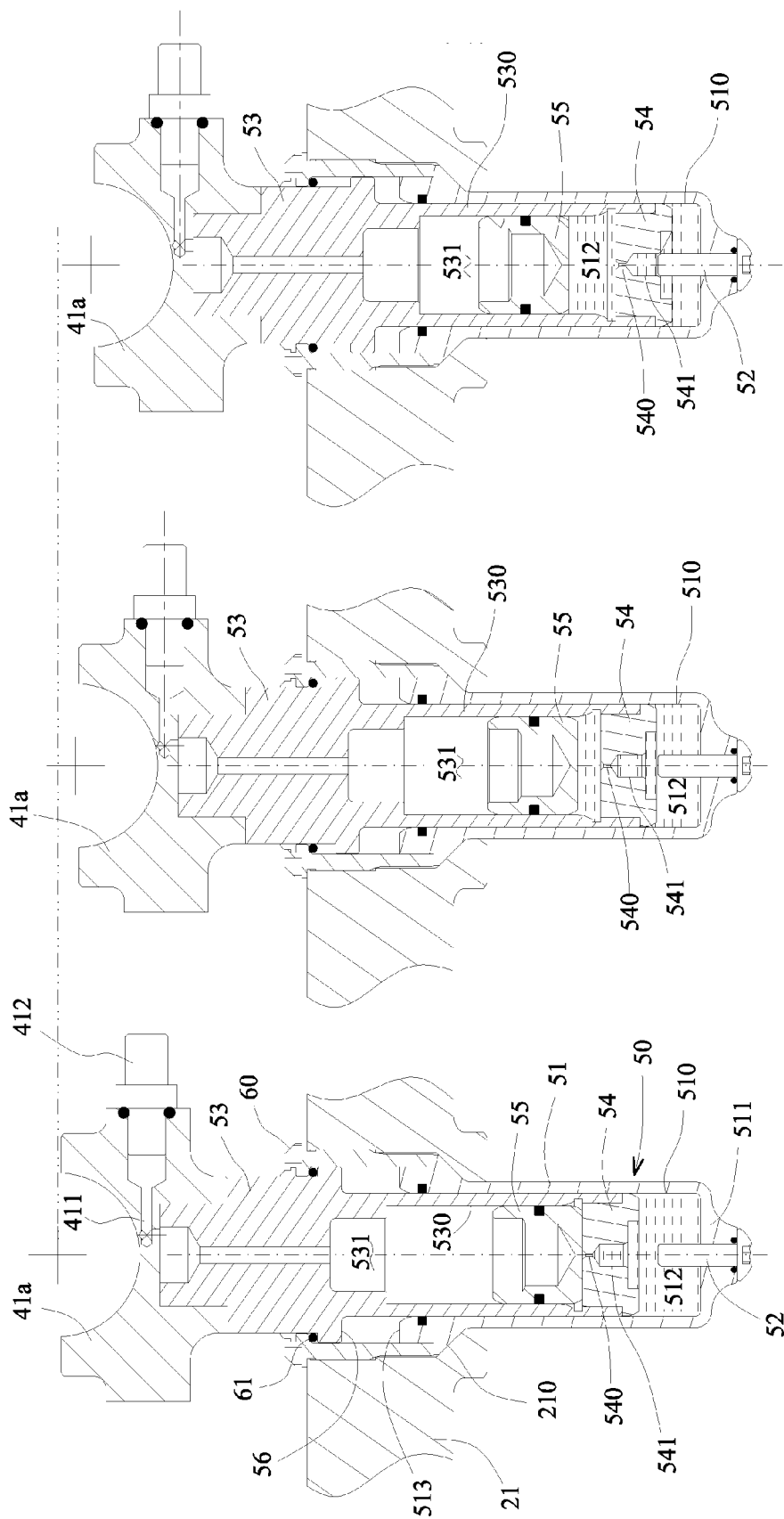
FIGS. 4a to 4c show an embodiment of a handlebar damper according to the invention, in respectively three different situations.

FIGS. 4a to 4c show in section a handlebar damper 50 according to the present invention in three different positions: FIG. 4a, at rest; FIG. 4b, in the intermediate position; FIG. 4c, in the position almost at the end of its travel.

A handlebar damper 50 is therefore fixed in a hole 210 that a top triple clamp 21 has, by means of a suitable nut 60. It is moreover provided with a bridge plate 41a as already explained above in relation to FIG. 3.

A handlebar damper 50 according to the embodiment shown comprises a substantially cylindrical-shaped main barrel 51, provided with a blind bore 510 that is closed at its bottom end by a bottom wall 511. This bottom wall 511 is designed to receive a screw 52 that serves as a drainage plug and the free end of which is smooth in order to fulfil a function that will be explained below.

Inside the bore 51, a plunger 53 can slide, which is provided with a bore 530 on the one hand closed, at the end opposite the bottom wall 511 of the main barrel 51, by a plug 54 pierced with a calibrated hole 540 forming a nozzle and on the other hand open at the other end onto a channel 411 pierced in the bridge plate 41 and closed by a valve 412. In the bore 530, a free piston 55 can also slide.

The space that is situated between the bottom wall 511 of the barrel 51 and the face of the free piston 55 opposite the plug 54 is filled with a non-compressible fluid, such as oil, whereas the space in the bore 530 of the plunger 53 turned towards the opposite face of the free piston 55 is filled with a compressible fluid, such as a gas, for example air or nitrogen. By means of the valve 412, the compressible fluid is pressurised, for example around 3 bars.

The functioning of the handlebar damper 50 is as follows:

In FIG. 4a, it is shown at rest. The pressurised compressible fluid 531 acts on the free piston 55 so that it is once again in abutment against the plug 54. All the non-compressible liquid 512 is situated in the space in the bore 510 formed between the plug 54 and the bottom wall 511. The plunger 53 is in upper abutment against a shoulder 61 that the nut 60 has, with a force F0 that depends on the pressure of the compressible fluid 531 in the bore 530.

For example, in a particular embodiment of the present invention, if this pressure is 3 bars, the surface of the free piston 55 is 2.4 cm$^2$, and the force F0 is 60 N.

In FIG. 4b, the force F that is exerted on the plunger 53, via the bridge plate 41a, is greater than the force F0 so that the plunger 53 slides in the bore 510. The non-compressible fluid 512 then flows, via the calibrated hole 540, into the space in the bore 530 between the plug 54 and the free piston 55, which has the effect of pushing the free piston 55 in the bore 530 and increasing the pressure of the compressible fluid 531, to equilibrium when the force on the free piston 55 due to the pressure of the compressible fluid 531 is equal to F.

Nevertheless, this equilibrium is not reached instantaneously, but progressively depending on the diameter of the calibrated hole 540 and the flow properties of the non-compressible fluid. It is this progressiveness that enables the handlebar damper 50 to have its damping characteristic and its dynamic behaviour. In embodiments that give complete satisfaction, the diameter of the calibrated hole 540 is between 0.1 mm and 3 mm according to the viscosity characteristics of the non-compressible fluid.

In FIG. 4c, the force F has increased further with respect to the situation in FIG. 4b. It can be seen that more non-compressible fluid 512 has flowed into the space in the bore 530 between the free piston 55 and the plug 54, pushing the free piston 55 a little more and compressing the compressible fluid 531a little more.

In order to increase further the damping characteristic of the handlebar damper 50, the plug 54 has a bore 541 into which, from a given travel of the plunger 53, the end of the screw 52 can enter, thus reducing further the cross section of flow of the non-compressible fluid 512 to the bore 530. By way of example, the fit between the bore 541 and the end of the screw 52 is of the H7g6 type. The length of the screw 52 makes it possible to adjust the travel as from which the damping characteristic will be increased.

When the force F relaxes to a value less than or equal to the threshold value F0, the pressure of the compressible fluid 531 exerts a force Fp on the free piston 55, which transmits it to the non-compressible fluid 512. The latter then flows via the tight hole 540 to the space between the plug 54 and the bottom wall 52, which has the effect of lifting the plunger 53, which slides in the bore 510. There is thus a change possibly from the situation in FIG. 4c to the situation in FIG. 4b and, in any event, from the situation in FIG. 4b to the idle situation in FIG. 4a. It will be noted that the progressiveness is the same as in the other direction. The damping effect is therefore symmetrical.

In summary, the valve 42 makes it possible to establish the pressure of the compressible fluid 531, which determines the threshold force F0 beyond which the handlebar damper 50 will have an effect. This effect is then said "pre-stressing of the handlebar damper system". The diameter of the calibrated hole 540, and the flow characteristics of the non-compressible fluid 512, determine the progressiveness of the handlebar damper 50 and thus the damping effect and its dynamic behaviour. Finally, the length of the screw 52 determines the travel of the plunger 53 as from which the damping effect is more pronounced.

It should be noted that the travel of the plunger 53 is limited, in particular to the distance that separates a shoulder 56 on the plunger 53 and another shoulder 513 on the barrel 51 of the handlebar damper 50. In an embodiment that is completely satisfactory, the maximum travel of the plunger 53 is between 5 mm and 30 mm. By way of comparison, the maximum movement of a conventional motorcycle front fork is around 100 to 300 mm, that is to say a higher order of magnitude.

Although the handlebar damper described in relation to FIGS. 4a and 4c has a symmetrical behaviour since this behaviour is the same both on outward and return, the present invention is not limited to dampers with such a behaviour.

Figure 5:
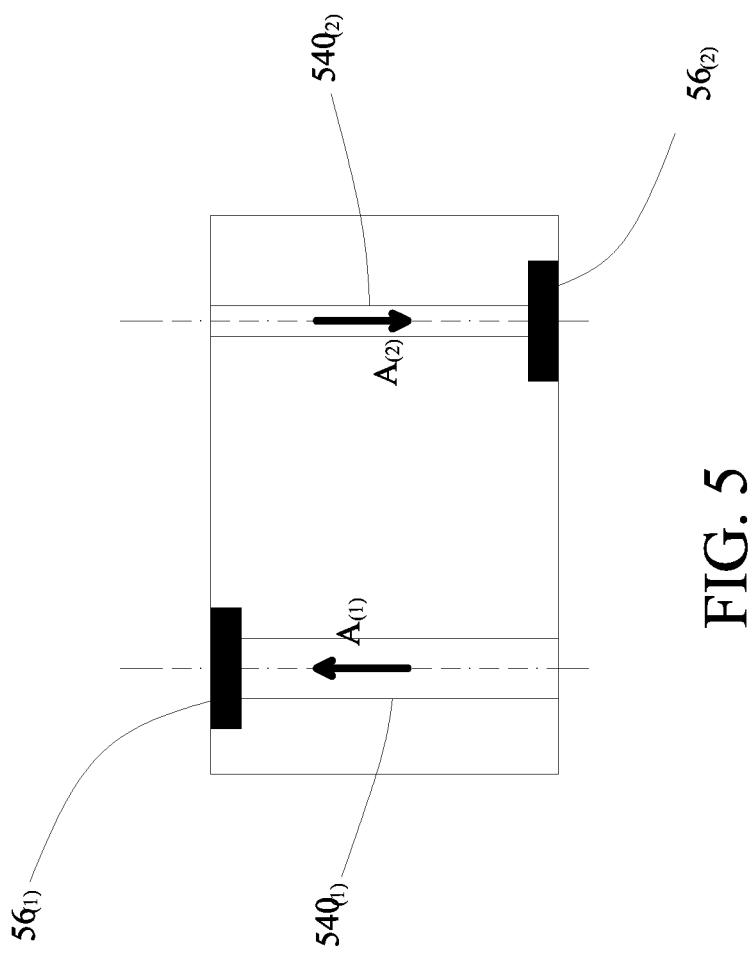
FIG. 5 shows a plug 54 that could be submitted for the one that is shown in FIGS. 4a to 4c and makes it possible to obtain asymmetric functioning.

FIG. 5 shows a plug 54 that could be substituted for the one that is shown in FIGS. 4a to 4c and makes it possible to obtain asymmetric functioning.

This plug 54 is provided with two calibrated holes $540_1$ and $540_2$, which have different diameters and, by virtue of respective valves $56_1$ and $56_2$, allow the passage of the non-compressible fluid only in one direction, respectively shown by the arrows $A_1$ and $A_2$. In flowing through the calibrated hole $540_1$ (or respectively $540_2$) in the direction of the arrow $A_1$ (or respectively $A_2$), the fluid lifts the valve $56_1$ (or respectively $56_2$) and can thus pass through the plug 54. In the other direction, the valve $56_2$ (or respectively $56_1$) closes and does not allow fluid to pass.

Thus this valve system enables the non-compressible fluid to pass through a calibrated hole in one direction with a different diameter from the calibrated hole of the passage in the other direction.

The invention claimed is:

1. A set of triple clamps in a front suspension system of a motorcycle, said set comprising a top T-piece and a bottom T-piece designed to provide a pivoting connection of the front suspension system of the motorcycle with a frame of said motorcycle, a fixing system consisting of a bottom bridge plate or bottom bridges designed to receive handlebars of said motorcycle and a top bridge plate or top bridges for respectively cooperating with said bottom plate or with said bottom bridges in order to grip and fix the handlebars of the motorcycle, and said bottom bridge plate or said bottom bridges being mounted on the top T-piece by means of at least one handlebar damper system comprising an elastic element and a hydraulic element and allowing through its movement on a first movement axis which is substantially parallel to a second movement axis of the front suspension system of said motorcycle, wherein there are only translation movements of the handlebars on said first movement axis.

2. The set of triple clamps according to claim 1, wherein said at least one handlebar damper system has at least one characteristic that is different from the corresponding characteristics of said front suspension system and wherein said at least one characteristic comprises at least one of maximum travel, response time, and pre-stressing.

3. The set of triple clamps according to claim 1, wherein said handlebar damper system has a maximum travel of between 5 mm and 30 mm.

4. The set of triple clamps according to claim 1, wherein pre-stressing of said handlebar damper system is predeterminable.

5. The set of triple clamps according to claim 1, wherein the first movement axis of said at least one handlebar damper system has an angle of less than 10° with respect to the movement axis of the front suspension system of said motorcycle.

6. The set of triple clamps according to claim 1, wherein said handlebar damper system consists of two handlebar dampers.

7. The set of triple clamps according to claim 6, wherein each of said two handlebar dampers comprises a barrel provided with a blind bore in which a plunger can slide, said plunger being provided with a cavity in which a free piston can slide subjected on a first face to an elastic return force and on a second face to a force due to the action of a non-compressible fluid in communication, by means of at least one calibrated hole, with the space in the bore of said barrel closed by said plunger.

8. The set of triple clamps according to claim 7, wherein said elastic return force is exerted by a spring.

9. The set of triple clamps according to claim 7, wherein said elastic return force is exerted by a pressurised compressible fluid.

10. The set of triple clamps according to claim 9, wherein the pressure of the compressible fluid is pre-established by means of a valve.

11. The set of triple clamps according to claim 7, wherein each said calibrated hole has a diameter of between 0.1 mm and 3 mm.

12. The set of triple clamps according to claim 7, further comprising valves so that said at least one calibrated hole acts in a direction of flow of said non-compressible fluid and so that at least one other calibrated hole with a different diameter acts in a other direction of flow.

13. The set of triple clamps according to claim 7, further comprising means for restricting a passage at a predetermined travel.

* * * * *